United States Patent
Käch

(10) Patent No.: US 7,029,250 B2
(45) Date of Patent: Apr. 18, 2006

(54) PULSATION DAMPER

(75) Inventor: Robert Käch, Sursee (CH)

(73) Assignee: KNF Flodos AG, Sursee (CH)

( * ) Notice: Subject to any disclaimer, the term of this patent is extended or adjusted under 35 U.S.C. 154(b) by 355 days.

(21) Appl. No.: 10/450,017

(22) PCT Filed: Nov. 15, 2001

(86) PCT No.: PCT/EP01/13224

§ 371 (c)(1),
(2), (4) Date: Jun. 6, 2003

(87) PCT Pub. No.: WO02/46657

PCT Pub. Date: Jun. 13, 2002

(65) Prior Publication Data

US 2004/0031529 A1 Feb. 19, 2004

(30) Foreign Application Priority Data

Dec. 8, 2000 (DE) .............................. 100 61 188

(51) Int. Cl.
*F16L 55/04* (2006.01)
*F04B 11/00* (2006.01)

(52) U.S. Cl. ........................ 417/540; 138/26; 138/30

(58) Field of Classification Search ............... 417/540; 138/26, 30
See application file for complete search history.

(56) References Cited

U.S. PATENT DOCUMENTS

| 3,035,613 | A |   | 5/1962  | Beatty |
|-----------|---|---|---------|--------|
| 3,169,551 | A |   | 2/1965  | Lewis |
| 3,867,963 | A |   | 2/1975  | Ballard |
| 4,427,029 | A | * | 1/1984  | Charney et al. ............... 138/30 |
| 4,629,562 | A | * | 12/1986 | Kercher ................... 210/198.2 |
| 5,535,724 | A |   | 7/1996  | Davis |
| 6,669,455 | B1 | * | 12/2003 | Welch ......................... 417/540 |
| 6,688,335 | B1 | * | 2/2004  | Kobayashi et al. ........... 138/30 |

FOREIGN PATENT DOCUMENTS

| DE | 1 963 709      | 7/1971 |
| DE | 199 10 100 A 1 | 9/2000 |

* cited by examiner

*Primary Examiner*—Charles G. Freay
(74) *Attorney, Agent, or Firm*—Volpe and Koenig, P.C.

(57) ABSTRACT

A pulsation damper which is used for damping pressure variations in an oscillating positive-displacement pump connected thereto is provided. The pulsation damper includes an inlet connection element, an outlet connection element and a line connecting the elements whereby these three components are connected to at least two damper chambers inside the pulsation damper, the damper chambers being connected in series inside the damper housing. One section of the line connected to the inlet connection element includes a connection channel to a first damper chamber and is joined to a second damper chamber via an inlet throttle element. The second damping chamber is connected to the outlet connection element via an outlet throttle. Damper elements made of an elastic material are disposed within the damper chambers.

13 Claims, 2 Drawing Sheets

PULSATION DAMPER

BACKGROUND

The present invention relates to a pulsation damper for an oscillating positive-displacement pump, having an inlet connection element, an outlet connection element, and a line that connects these elements and is connected to a damping chamber inside the pulsation damper, where provided in the damper housing, in which the inlet connection element is connected to the damping chamber by a connecting channel, is a damping element made of an elastic material.

Pulsation dampers have the object of reducing pressure fluctuations produced by an oscillating positive-displacement pump. Oscillating pumps have the characteristic that they convey liquid or gas, as a pumping medium, only during 180° of a rotation, thus causing pulsations. In slow-running pumps, this results in a correspondingly irregular delivery stream, while in fast-running pumps pressure fluctuations occur. This is undesirable for many applications.

Pulsation dampers are known in various specific forms.

From DE 1 963 709, a damper is known with which pressure impacts in line networks can be prevented or reduced. For this purpose, this device has a damping chamber in which an elastically flexible component is placed. In this way, it is possible to dampen pressure impacts that occur in line networks when outlet fittings connected thereto are closed. In connection with oscillating positive-displacement pumps, such dampers do not yield sufficient smoothing of the delivery stream flow or of the occurring pressure pulsation.

From U.S. Pat. No. 3,035,613, a pulsation damper for use in tubes or lines is known, that is in particular directed to damping pressure surges in pipe lines. A connecting channel is connected to a damping chamber, that includes a ring-shaped damping element made of an elastic material that is filled, for example, with air.

This damper does not provide, in connection with an oscillating positive-displacement pump, a sufficient smoothing of the delivery stream flow or of the occurring pressure pulsation

SUMMARY

The object of the present invention is to create a pulsation damper that enables a high degree of damping of the occurring pressure fluctuations, in particular in connection with an oscillating positive-displacement pump. A simple adaptation, as needed, to pumps having different pump capacities, and/or to different system pressures, is also to be provided. Finally, the pulsation damper should have a simple, compact design.

In order to achieve this object, it is proposed that the pulsation damper for a positive-displacement pump have at least two damping chambers connected in series be provided inside a damper housing, and that for this purpose a line segment connected to the inlet connection element have a connecting channel to a first damping chamber, as well as being connected, via an inlet throttle element, to a second damping chamber that is connected with the outlet connection element via an outlet throttle element, that the damping chamber is separated by a separating membrane into a receiving space for the damping elements made of elastic material and an area that conducts the pumping medium.

The connection in series of a plurality of damper stages achieves a high degree of damping that increases exponentially with the number of damper stages. The throttle elements, in connection with the damping chambers, form damping elements that are able to intermediately store and re-emit pumping medium when pressure fluctuations occur. Through the throttle elements, during a pressure impact a dynamic pressure is built up, through which a pressure charging of the damping elements, and a throttled emission of pumping medium, is possible during the pressure fall-off phase that follows the pressure phase.

Through the passage cross-section of the throttle elements, an adaptation to the desired degree of damping or to the permissible remaining pulsation after the damper is possible. Likewise, the dynamic pressure, and therewith the occurrent pressure loss of the damper, can be adjusted via the throttle elements. In this way, the damper can be adapted to a large number of types of pump having different pumping capacities and/or system pressures, without further modifications.

Through the partitioning of the damping chamber with the separating membrane into the receiving space for the damping element and the area for conducting the pumping medium, the damping elements can not come into contact with the pumping medium, so that the desired damping element with the desired damping characteristics can be selected, and a resistance to the pumping medium is not a consideration. In this way, aggressive pumping medium can be handled without problems through appropriate material selection of the separating membrane.

In order to enable such an adaptation to be carried out easily, and even retrofitted if necessary, the inlet and outlet throttle elements are formed as exchangeable inserts. They can be screwed in as bushings or pressed in.

Nozzles, diaphragms, stepped nozzles, capillary vessels, or adjustable nozzles, for example needle valves, can be used.

Preferably, the damping material used inside the receiving space of the damping chamber for the damping elements has an approximately linear elastic characteristic. The elastic damping elements thus have characteristics similar to that of a spring, which is desirable. These elastic characteristics achieve a particularly good damping effect. For example, a damping material can be used that can be compressed even in a closed space, which is not possible for example if rubber is used as a displacement material.

According to a construction of the present invention, the non-loaded separating membrane that limits the liquid-conducting area of the damping chamber(s) is situated at a distance from the damping material.

If the damper is used for a low system pressure, only the soft separating membrane acts as an elastic element. This makes it possible to effectively dampen even small pressure spikes. Given a higher system pressure, the separating membrane is supported partly or completely on the damping material. It is thus protected against excessive expansion and damage, and in this operating state a damping also takes place by means of the damping material.

Another construction provides that the damping elements have a filling volume that is greater than the volume of the receiving space for the damping elements, limited by the separating membrane in the non-loaded state, and that the separating membrane is pre-stressed by the damping elements. If the damper is used for a high system pressure, the separating membrane is pre-stressed by the damping material in the direction opposite to that of the excursion under pressure. In this way, a relatively soft damping material can be used even for a high system pressure, and the damping is optimized over a large pressure range.

Advantageously, the damping elements of the second damping chamber are more flexible or have a softer elasticity than those of the first damping chamber. In the first stage, which has a harder construction, the large pressure spikes are thereby compensated, and in the second, softer damping stage the remaining pressure fluctuations are compensated.

According to a specific embodiment of the present invention, the pulsation damper has a two-part housing having a housing head and a housing lower part, the separating membrane being situated in the separating plane as a sealing element.

In this way, the separating membrane forms not only the division of the damping chambers into the receiving space and the area that conducts the pumping medium, but also seals the individual chambers and channels against one another and outwardly.

It is advantageous if the inlet and outlet connection elements, the line channels, the inlet and outlet throttle elements, and the areas of the damping chambers that conduct pumping medium are all situated in the housing head, and the receiving spaces for the damping elements are provided in the housing lower part. In this way, all functional areas of the pulsation damper are easily accessible after the separation of the housing head and the housing lower part.

BRIEF DESCRIPTION OF THE DRAWINGS

Additional embodiments of the invention are indicated in the subclaims. In the following, the present invention is explained in its primary details, on the basis of the accompanying drawings.

DETAILED DESCRIPTION OF THE PREFERRED EMBODIMENTS

Figure 1:
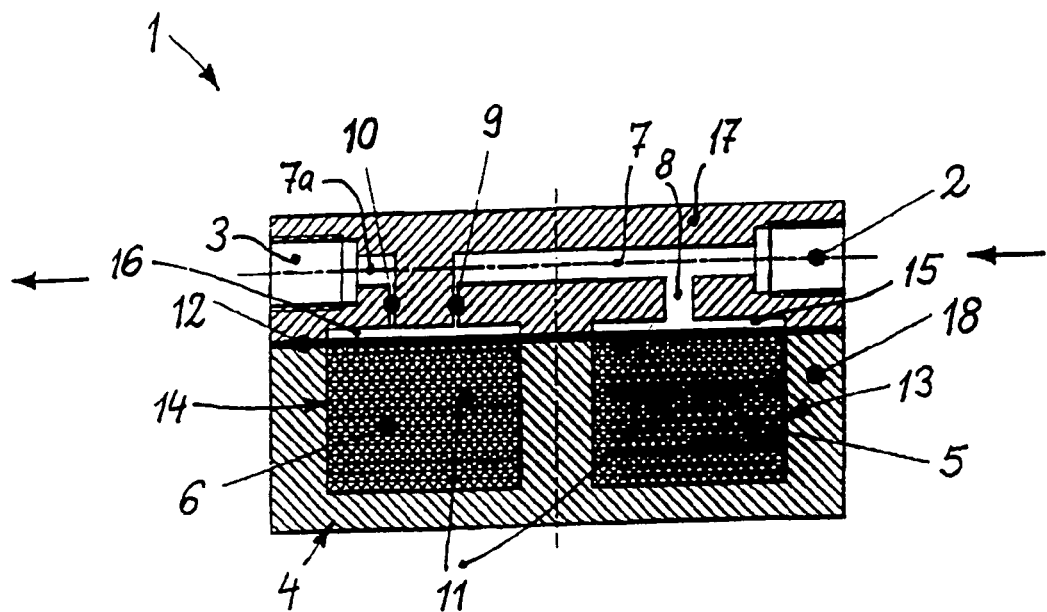
FIG. 1 shows a cross-sectional representation of a pulsation damper.

A pulsation damper 1 shown in FIG. 1 is used for the damping of pressure fluctuations that are produced by an oscillating positive-delivery pump. The pressure connection elements of such a positive-delivery pump can be connected to inlet connection element 2 of the pulsation damper 1 for the damping of the pressure fluctuations, in order to reduce these pressure fluctuations. The pumping medium, supplied at the inlet connection element 2, exits at an outlet connection element 3 of the pulsation damper 1, having been smoothed with respect to the pressure fluctuations. The pulsation damper 1 has a housing 4 in which two damping chambers 5, 6 are provided. A line segment 7 having a branching point 8 into the first damping chamber 5 is connected to the inlet connection element 2. In addition, the line segment 7 is connected to the second damping chamber 6 via an inlet throttle element 9. From this damping chamber stream then flows through an outlet throttle element 10 to the outlet connection element 3.

Inside the damping chambers 5 and 6, there are placed damping elements 11 made of elastic material. The damping elements 11 are situated in a receiving space 13 or 14 that is divided by a separating membrane 12 inside the respective damping chamber 5 or 6. The remaining part of the damping chambers 5, 6 above the separating membrane 12 is the pumping-medium-conducting area 15, 16.

The inside volume of the pumping-medium-conducting area at least of thr first damping chamber 5, but if necessary (as shown in FIG. 1) also of the two areas 15, 16, corresponds at least to the delivery capacity of a pump stroke, but the pumping medium (gaseous or liquid) also plays a role here. A small volume of the pumping-medium-conducting areas 15, 16 is provided for liquids, while a larger volume, as shown in FIG. 3, is provided for gaseous pumping media.

The volume of the receiving spaces 13, 14, with the damping material situated therein, corresponds to a multiple of the delivery capacity of a pump stroke, preferably to approximately ten times this capacity.

Figure 3:
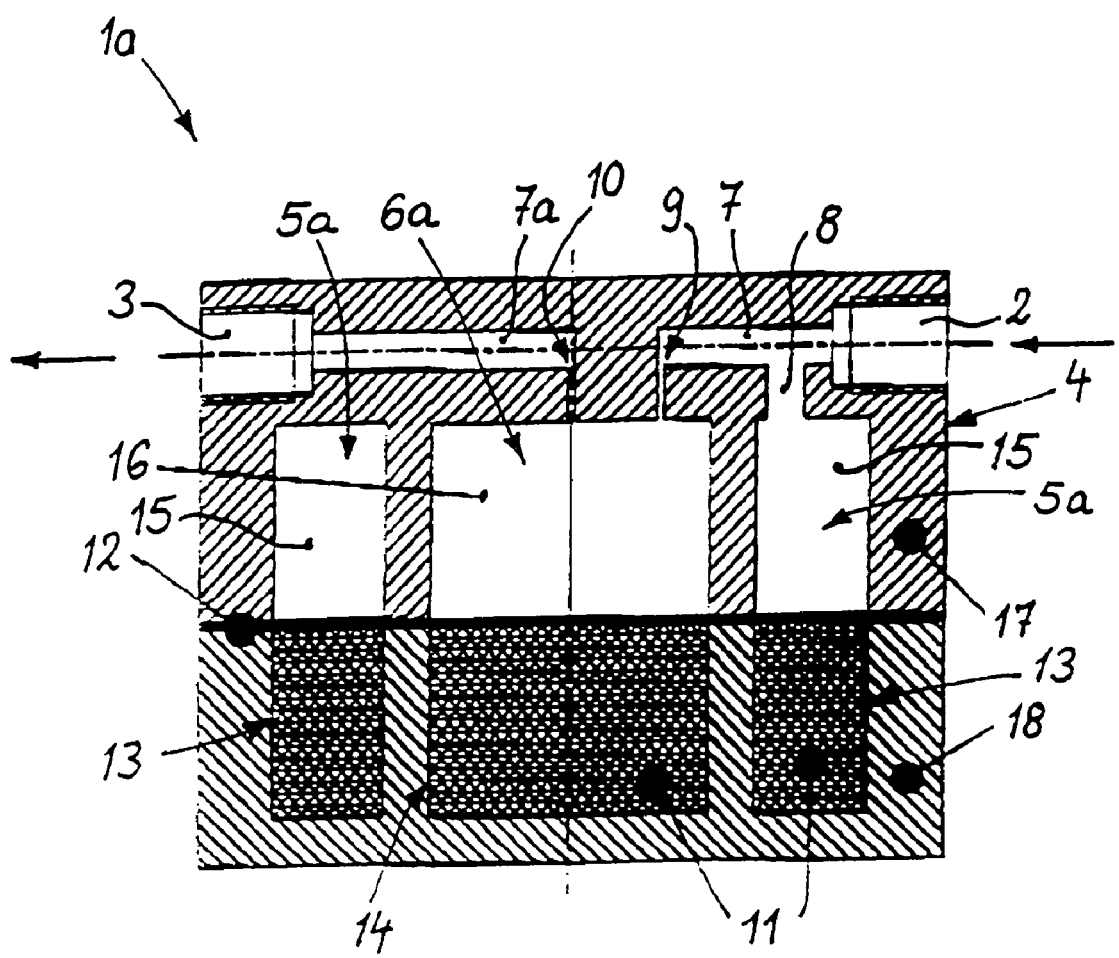
FIG. 3 shows a cross-sectional view of a pulsation damper in a specific embodiment that is modified in relation to that shown in FIG. 1.

As can be seen in FIGS. 1 and 3, the damping elements 11 fill the receiving spaces 13 or 14 completely. Nonetheless, an elastic flexibility is present, which would not be possible using a material similar to rubber.

In the exemplary embodiment, the filling volume of the receiving spaces 13 and 14 with damping material is provided such that the receiving spaces are already filled when the separating membrane 12 is relaxed.

However, it is also possible for a smaller filling volume to be provided, so that the non-loaded separating membrane 12, which limits the respective receiving space 13 or 14 of the damping chambers 5, 6, is situated at a distance from the damping material. The separating membrane 12, which is then exposed in the non-loaded state and is distanced from the damping material by an air gap, acts as an elastic element that can effectively dampen small pressure spikes. Given a higher pressure loading, the separating membrane 12 is deformed until it comes into contact with the damping elements 11 and is supported by these elements in elastic fashion. In addition, it is possible that enough damping material is placed into the receiving spaces 13, 14 that the separating membrane 12 is somewhat deflected, and thus pre-stressed, at the pumping-medium-conducting areas 15 and 16. In this way, it is possible to use a comparatively soft damping material, while nonetheless achieving a good damping effect even given high system pressures. In particular, in this way an optimal damping effect can be achieved over a large pressure range. In addition, the pre-stressing of the damping material enables a compact construction of the damper and the use of the same housing parts for low-pressure use and for high-pressure use.

In the two receiving spaces 13 and 14, the damping elements 11 having different spring characteristics can also be used; here it is useful to use a somewhat harder material in the receiving space 13 of the first damping chamber 5 than is used in the receiving space 14 of the second damping chamber 6. In this way, large pressure spikes can be compensated by the first damping element with damping chamber 5, while the remaining pressure fluctuations can be compensated to the greatest possible extent in the second damping element with the damping chamber 6.

Through the two damping chambers 5 and 6, which are connected in series, a particularly godd damping effect is achieved in a small space. During the pressure phase, which extends over approximately 180° of a rotation in a positive-delivery pump, a system pressure is built up that produces a dynamic pressure through the inlet and outlet throttle elements 9 and 10, by means of which the separating membrane 12 is deflected towards the damping elements 11 in the area of the damping chamber 5. These damping elements, made of elastic material, build up a counter-load having the same order of magnitude. The constant modification of the delivery quantity due to the oscillating pump characteristic, or the pressure fluctuations that occur as a result of this, have the result that pumping medium is intermediately stored and then emitted again. Like the pressure force at the pump side, which represents a surface load, the damping elements likewise build up the counter-force as a surface load. Due to the construction and the manner of operation as a surface load, the dividing membrane 12 has the property of having a soft effect given a local loading, and a hard effect given a surface loading. For this reason, this type of damper can also be used with high system pressures.

In the exemplary embodiment, the pulsation damper 1, as already mentioned, has a two-stage construction, in which the two damping units are connected in series. Per stage, a reduction of the pressure amplitude by a particular factor is possible. The remaining pulsation of the first stage is further reduced in the second stage. By this serial arrangement, a damping is possible that potentially increases with the number of stages. Due to the housing of both damping stages in one housing 4, a compact constructive form is possible, and a more economical manufacturing is possible than is the case with the use of two separate individual dampers connected in series via lines.

The inlet throttle element 9 has the job of producing a dynamic pressure towards the pump. During a pressure impact from the pump, this dynamic pressure loads the first damper having the damping chamber 5, and, via the inlet throttle element 9, also loads the second damper having the damping chamber, During the lower pre-pressure time periods, the pumping medium content stored in the damper is re-emitted to the system, throttled via the outlet connection element 3.

Through an appropriate selection of the passage cross-sections of the inlet throttle element 9 and of the outlet throttle element 10, the desired damping effect, or the allowable remaining pulsation after the pulsation damper 1, is achieved. Likewise, the allowable dynamic pressure, or pressure loss, of the pulsation damper 1 can be adjusted via the passage cross-section of the throttle elements. If the throttle elements are formed as exchangeable inserts, the pulsation damper 1 can be adapted to a large number of pump types and different flow rates while retaining a constant constructive volume. In the depicted exemplary embodiment, the throttle elements 9, 10 are formed as bored holes, in non-exchangeable fashion.

Figure 2:
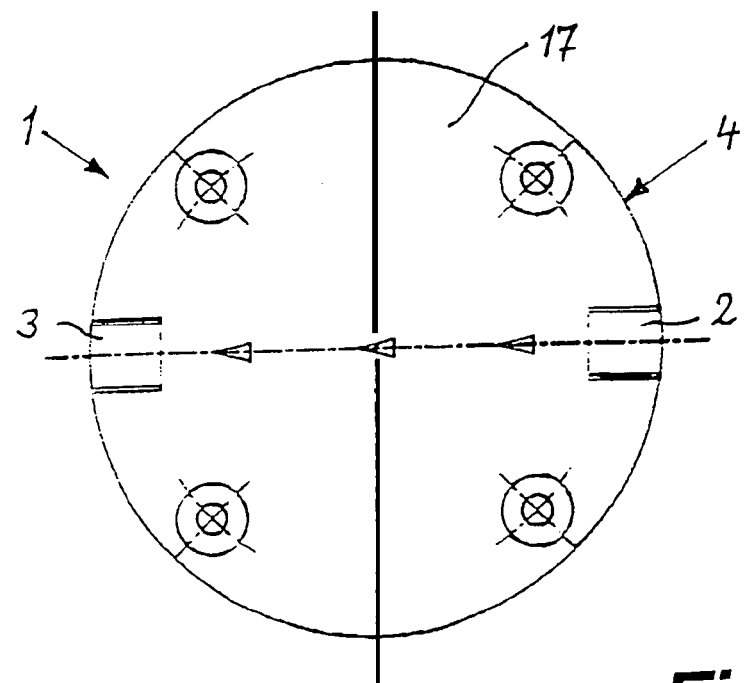
FIG. 2 shows a plan view of the pulsation damper indicated in FIG. 1.

In the exemplary embodiment, the housing 4 has a two-part construction, having a housing head 17 and a housing lower part 18, with the separating membrane 12 being situated in the separating plane in continuous fashion as a sealing element. It thereby covers both of the damping chambers 5 and 6, and extends up to the outer edge of housing 4, so that the individual chambers are sealed against one another and outwardly. As is shown in FIG. 2, the housing 4 can have a round construction. Here the two damping chambers 5 to 6 each extend approximately over half of the circular cross-section. In the exemplary embodiment, the housing head 17 and the housing lower part 18 are held together by four screws.

In the housing head, the inlet and outlet connection elements 2 or 3 are situated diametrically opposite one another; here the line segment 7 is connected to the inlet connection element 2, and a line segment 7a is connected to the outlet connection element 3. The line segment 7a is connected with the second damping chamber 6 via the outlet throttle element 10. From the line segment 7, the branch 8 goes to the first damping chamber 5, and the inlet throttle element 9 leads from the line segment 7 into the second damping chamber 6.

FIG. 3 shows a modified specific embodiment of a pulsation damper 1a, in which the first damping chamber 5a is situated concentrically around the second, centrally situated damping chamber 6a, thus forming an annular chamber. However, the design of this pulsation damper 1a corresponds in principle to that shown in FIG. 1.

The invention claimed is:

1. A pulsation damper for an oscillating positive-displacement pump, comprising an inlet connection element, an outlet connection element (3), and a line that connects these elements and is connected to a damping chamber inside the pulsation damper, wherein at least two damping chambers (5, 5a, 6, 6a) connected in series are provided inside a damper housing (4), and a line segment connected to the inlet connection element (2) has a connecting channel to a first damping chamber (5, 5a) as well as being connected, via an inlet throttle element, to a second damping chamber (6, 6a) that is connected with the outlet connection element (3) via an outlet throttle element, and the inside of each damping chamber (5, 5a, 6, 6a) is divided by a separating membrane (12) into a receiving space (13, 14) for a damping element (11) made of an elastic material and an area (15, 16) that conducts pumping medium.

2. The pulsation damper as recited in claim 1, wherein the inside volume of the pumping-medium-conducting area (15, 16) of at least the first damping chamber (5, 5a) corresponds at least to a delivery capacity of a pump stroke.

3. The pulsation damper as recited in claim 1, wherein the elastic material used inside the receiving space (13, 14) of the damping chambers (5, 5a, 6, 6a) for the damping elements (11) has an approximately linear elastic characteristic.

4. The pulsation damper as recited in claim 1, wherein a volume of the damping elements (11) corresponds to a multiple of the delivery capacity of a pump stroke.

5. The pulsation damper as recited in claim 1, wherein each of the separating membranes (12) in a non-loaded state that limits the pumping-medium-conducting area (15, 16) of the damping chamber (5, 5a, 6, 6a) is situated at a distance from the damping material (11).

6. The pulsation damper as recited in claim 1, wherein the damping elements (11) have a filling volume that is greater than a volume of the receiving space (13, 14), limited by the separating membrane (12) in the non-loaded state, for the damping elements (11), and the separating membrane (12) is pre-stressed by the damping elements (11).

7. The pulsation damper as recited in claim 1, wherein the damping elements (11) of the second damping chamber (6, 6a) are more flexible than are the damping elements of the first damping chamber (5, 5a).

8. The pulsation damper as recited in claim 1, further comprising a two-part housing (4) having a housing head (17) and a housing lower part (18), and the separating membrane (12) is situated in a separating plane between the housing parts as a sealing element.

9. The pulsation damper as recited in claim 8, wherein the inlet and outlet connection elements (2, 3), the line which connects the inlet and outlet connection elements (2, 3), the inlet and outlet throttle elements (9, 10), and the pumping-medium-conducting areas (15, 16) of the damping chambers (5, 5a, 6, 6a) are provided in the housing head (17), and the receiving spaces (13, 14) for the damping elements (11) are provided in the housing lower part (18).

10. The pulsation damper as recited in claim 1, wherein the damper housing (4) has a round construction, and the inlet and outlet connection elements (2, 3) are situated diametrically opposite one another and each have first and second bores (7, 7*a*) that are directed inward and are generally in alignment, the damping element receiving spaces (13, 14) each extend over approximately half of a housing base surface, and the first bore (7) connected with the inlet connection element (2) extends into an area of the second damping chamber (6, 6*a*) and is connected with both of the damping chambers (5, 5*a*, 6, 6*a*), the second bore (7*a*) connected with the outlet connection element (3) is connected with the second damping chamber (6, 6*a*) via the outlet throttle element (10).

11. The pulsation damper as recited in claim 1, wherein the first damping chamber (5*a*) is situated concentrically around the second damping chamber (6*a*), and is generally formed as an annular chamber.

12. The pulsation damper as recited in claim 1, wherein the inlet and outlet throttle elements (9, 10) are formed as exchangeable inserts.

13. The pulsation damper as recited in claim 1, wherein a volume of the damping elements (11) corresponds to ten times the delivery capacity of a pump stroke.

* * * * *